US008844686B2

United States Patent
Muehlegger

(10) Patent No.: US 8,844,686 B2
(45) Date of Patent: Sep. 30, 2014

(54) FRICTION ELEMENT

(75) Inventor: Markus Muehlegger, Pinsdorf (AT)

(73) Assignee: Miba Frictec GmbH, Roitham (AT)

( * ) Notice: Subject to any disclaimer, the term of this patent is extended or adjusted under 35 U.S.C. 154(b) by 251 days.

(21) Appl. No.: 13/322,641

(22) PCT Filed: May 28, 2010

(86) PCT No.: PCT/AT2010/000188
§ 371 (c)(1),
(2), (4) Date: Nov. 28, 2011

(87) PCT Pub. No.: WO2010/135757
PCT Pub. Date: Dec. 2, 2010

(65) Prior Publication Data
US 2012/0067680 A1    Mar. 22, 2012

(30) Foreign Application Priority Data

May 29, 2009    (AT) .................................. A 835/2009

(51) Int. Cl.
*F16D 65/04*    (2006.01)
*F16D 69/04*    (2006.01)

(52) U.S. Cl.
CPC .................. *F16D 69/0408* (2013.01); *F16D 69/0416* (2013.01)
USPC ..................... 188/250 B; 188/234; 188/250 G

(58) Field of Classification Search
USPC .......... 188/234, 250 B, 250 E, 250 G, 251 R, 188/250 R
See application file for complete search history.

(56) References Cited

U.S. PATENT DOCUMENTS

| 2,451,326 | A | * | 10/1948 | Eksergian et al. | 188/234 |
| 3,198,294 | A | * | 8/1965 | Stacy | 188/234 |
| 3,297,117 | A | * | 1/1967 | Freholm | 188/234 |
| 4,830,164 | A | | 5/1989 | Hays | |
| 5,158,165 | A | | 10/1992 | Flotow | |
| 5,535,860 | A | | 7/1996 | Hummel et al. | |
| 5,538,108 | A | | 7/1996 | Russo | |

(Continued)

FOREIGN PATENT DOCUMENTS

| DE | 21 12 189 | 9/1972 |
| DE | 40 23 836 | 1/1992 |

(Continued)

OTHER PUBLICATIONS

International Search Report of PCT/AT2010/000188, date of mailing Sep. 6, 2010.

(Continued)

*Primary Examiner* — Melanie Torres Williams
(74) *Attorney, Agent, or Firm* — Collard & Roe, P.C.

(57) ABSTRACT

The invention relates to a method of producing a friction element comprising a friction lining (1) made from sintered material, which is applied to a support (2), and at least two recesses (4) are provided in the support (2), each for accommodating a connecting element for fitting the support (2) with the friction lining (1) on a supporting element (3). A cut-out (A, A1, A2) is provided in the friction lining (1) which surrounds at least two regions (B1 ... B4) spaced apart from one another in which the at least two recesses (4) of the support (2) for accommodating the connecting elements are disposed. The invention further relates to the friction lining (1) itself.

11 Claims, 2 Drawing Sheets

(56) References Cited

U.S. PATENT DOCUMENTS

| | | |
|---|---|---|
| 6,478,125 B1 | 11/2002 | Russo et al. |
| 2006/0151267 A1* | 7/2006 | Russo et al. .............. 188/250 B |
| 2008/0257664 A1 | 10/2008 | Holme et al. |

FOREIGN PATENT DOCUMENTS

| | | |
|---|---|---|
| EP | 0 619 439 | 10/1994 |
| EP | 0 674 119 | 9/1995 |
| EP | 1 099 061 | 11/2002 |
| JP | 64-045038 | 3/1989 |
| JP | 2001-241476 | 9/2001 |
| WO | WO 2007/060391 | 5/2007 |

OTHER PUBLICATIONS

Austrian Search Report in A 835/2009 dated Apr. 13, 2010.

* cited by examiner

FRICTION ELEMENT

CROSS REFERENCE TO RELATED APPLICATIONS

This application is the National Stage of PCT/AT2010/000188 filed on May 28, 2010, which claims priority under 35 U.S.C. §119 of Austrian Application No. A 835/2009 filed on May 29, 2009. The international application under PCT article 21(2) was not published in English.

The invention relates to a method of producing a friction element comprising a friction lining made from sintered material, which is applied to a support, and at least two recesses are provided in the support, each for accommodating a connecting element for fitting the support with the friction lining on a supporting element. The invention further relates to a friction lining of sintered material, comprising at least two cut-outs spaced apart from one another, each for accommodating a connecting element for fitting the friction lining on a supporting element as well as a friction element comprising a support on which a friction lining is disposed.

Friction linings of sintered material are often needed in the field of modern technology, for example as brake linings or clutch linings (especially for dry running clutches) in the automotive industry. In order to adapt the properties of the friction lining to the intended application as far as possible, different materials are mixed with one another in varying proportions and then "baked" to the desired shape of a component by means of a known sintering process.

As a rule, sintered friction linings are optimized in terms of all their properties with a view to improving friction force, which tends to be detrimental to other properties. For example, sintered friction linings are able to absorb only slight tensile and bending forces, which is why friction linings are usually applied to support plates made from steel, for example, with a view to ensuring a long service life in a brake or clutch. This support plate provided with the friction lining is then riveted onto the brake disc or clutch disc. Screws are also conceivable in theory but this is an option less commonly used for this purpose. The friction lining therefore fulfils the primary function of a brake or clutch, in other words for transmitting a braking torque or torque between a drive and output, whilst the function of the support layer is to join the friction elements to the clutch disc or brake.

Every supporting element has corresponding bores for riveting which lie at the edge or in the region of the friction element, depending on the design. If the bores are disposed in the region of the friction surface, the friction layer must also contain a corresponding bore for accommodating the rivet head. As a result, what is to a certain extent a very slim region is left free between the rivet holes. In addition, the friction linings are cold-forged after the sintering process in order to obtain a better seating on the clutch disc, i.e. the parts are not pressed flat but in a concave or convex arrangement. Depending on the thickness of the friction linings, high surface tensions therefore occur, especially in the region between the rivet holes, which can in turn lead to tearing between the rivet holes, depending on the friction material and sintered join.

In this respect, FIG. 1 is a plan view and side view in section illustrating an example where a friction lining 1 (in this instance a single segment of a clutch lining) has been applied to a support 2. Disposed in the friction lining 1 are cut-outs A1' and A2' spaced apart from one another, in this instance cylindrical bores, each of which is provided as a means of accommodating a connecting element, in this case rivets, for fitting the support 2 with the friction lining 1 on a supporting element 3, in this instance a clutch disc, disposed underneath or to the side of the support 2. The cut-outs A1' and A2' have a larger diameter than co-operating recesses 4 in the support 2 and supporting element 3, thereby resulting in a collar 5 on which the connecting elements, e.g. the head of the rivets, for securing the support 2 to the supporting element 3 sit. The tears mentioned above occur between the cut-outs A1' and A2'.

When producing a friction lining using conventional methods, tears which often occur in the region between the cut-outs for the connecting elements can lead to crumbling of the friction lining during operation. This is a disadvantage, on the one hand because the effective friction surface and hence the power to be transmitted is reduced and on the other hand because loose parts can become deposited or clog the clutch or brake, thereby impairing its function. Furthermore, loose parts which occur during braking or coupling can become baked or welded onto the intact surface due to high temperatures and pressures and thus destroy them. Finally, the loose parts may also become welded to the co-operating surface and the resultant unevenness combined with the rotating movement can grind down the region between the cut-outs still further.

Since the safety aspects of these components are very important, this is an extremely undesirable not to say intolerable state because failure of a clutch lining and even more so a brake lining can have serious consequences and can represent a risk to life and limb as well as causing material damage.

Accordingly, the objective of the invention is to propose an improved friction lining with which the problems outlined above do not occur as well as a method of producing it.

The objective is achieved by the invention by means of a method as defined in claim 1, namely a method of producing a friction element with a friction lining made from sintered material, whereby a cut-out is provided in the friction lining which surrounds at least two regions spaced apart from one another in which the at least two recesses of the support for accommodating the connecting elements are disposed.

The objective is also achieved by the invention by means of a friction lining as defined in claim 6, namely a friction lining of sintered material having at least two regions spaced apart from one another, each for accommodating a connecting element for fitting the friction lining on a supporting element, and the at least two regions are disposed in a common cut-out in the friction lining.

The objective is also achieved by the invention by means of a friction element as defined in claim 9, namely a friction element provided with the friction lining proposed by the invention.

As a result of the invention, therefore, the formation of tears between several cut-outs is effectively prevented. Although this reduces the active friction surface, allowance can be made for this effect through design, unlike the problem of parts becoming detached and leading to unwelcome surprises. Furthermore, having taken precautions to prevent parts from becoming detached from the friction lining, the clutching and braking function can no longer be impaired. The risk of the friction lining being destroyed by particles sintered onto it is also effectively reduced. This being the ease, a friction lining proposed by the invention is significantly safer than a friction lining of the type known from the prior art. Accordingly, the underlying principle of the invention is to omit a part in order to make a friction lining safer, which a priori seems illogical because the reduction in friction surface which comes as part of the invention also means a reduction in friction performance (in other words clutch or brake performance) Finally, the process of cold forging the friction lining is improved.

Advantageous embodiments and improved features of the invention are defined in the dependent claims and description of the diagrams given in the appended drawings.

It is of advantage if the cut-out between the at least two regions has a narrowed region. This prevents the formation of tears in the friction lining and prevents particles from being detached without significantly reducing the active friction surface. The width of the narrowed region may be between 0.5% to approximately 100% of the maximum width of the cut-out (for example the bore diameter).

It is also of advantage if the cut-out in the at least two fitting regions is bounded by circular portions and tangentially adjoining straight portions lying in between. Although the friction surface is reduced to a more pronounced degree in this instance, the shape of the cut-out—a straight slot with rounded end regions—is nevertheless simpler. The region between the cut-outs is as wide as the cut-out itself, in other words the width of the intermediate region is 100% of the width of the cut-out (for example the bore diameter). However, this applies only if there are two mounting regions, whereas a bigger width will be needed if there are three and more mounting regions.

It is of particular advantage if the cut-out is produced prior to the sintering process, at the stage when the sinter powder is being pressed. Allowance for the cut-out can therefore be made during shaping of the friction lining green compact so that the friction lining is essentially finished after the sintering process or after calibration or reshaping. This also means that better use is made of the material, in other words the quantity with which the mold for the friction lining is filled is practically fully incorporated in the friction lining.

However, it is also of advantage if the cut-out is produced after the sintering process by one or more of the methods including milling, sawing, cutting, planing, broaching, grinding, punching or hot cutting (for example laser cutting, torch cutting or plasma cutting). In this case, the cut-out is produced after the sintering process. The mold used for the friction lining may therefore be based on a simpler design but an additional work step will then be required in order to produce the cut-out. This variant may offer advantages if, for example, friction linings have to be produced with the same dimensions but with different assembly or fitting regions. This means that the shape of the cut-outs can be varied.

At this stage, it should be pointed out that the variants of the method proposed by the invention described here as well as the resultant advantages naturally also apply to the friction lining proposed by the invention, even though the variants and advantages might only be mentioned in connection with the method proposed by the invention.

The embodiments and features of the invention described above may be used in any combination.

To provide a clearer understanding, the invention will be described in more detail below with reference to the appended drawings.

These are simplified, highly schematic diagrams of the following:

Figure 4A:
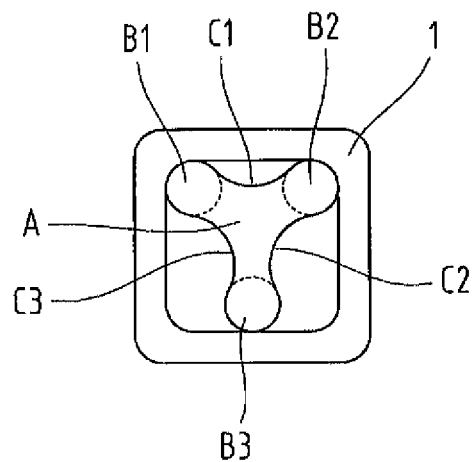
Figure 4B:
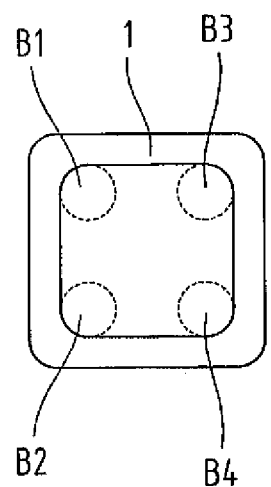
Figure 4C:
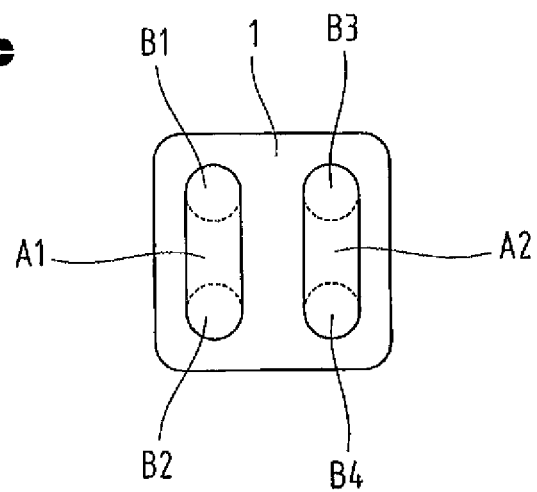

FIG. 4*a* shows a third embodiment of a friction lining proposed by the invention;

FIG. 4*b* shows a fourth embodiment of a friction lining proposed by the invention;

FIG. 4*c* shows a fifth embodiment of a friction lining proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

The embodiments illustrated as examples represent possible variants of the friction lining proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Figure 2:
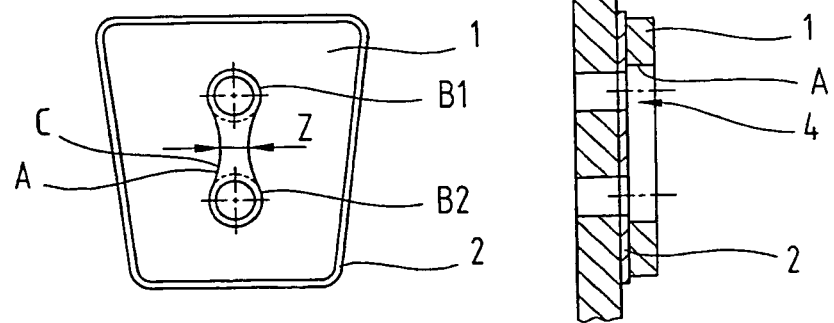
FIG. 2 shows a first embodiment of a friction lining proposed by the invention with an associated support.

FIG. 2 illustrates a first embodiment of a friction lining 1 proposed by the invention, having a cut-out A surrounding two regions B1 and B2 spaced apart from one another, provided as a means of accommodating a connecting element, in particular a rivet, for fitting the friction lining 1 on a supporting element 3, for example a clutch disc. Between the two regions B1 and B2, the cut-out A has a narrowed region C with the width z. The active friction surface is advantageously reduced only slightly by the narrowed region C.

The friction lining 1, produced by sintering, is disposed on a support 2. In particular, the friction lining 1 is sintered, glued or soldered onto the support 2, or alternatively, other joining methods might be used. The support 2 is specifically used as a means of connecting the friction lining 1 to the supporting element 3. To this end, the support 2 has at least two recesses 4 or bores in the region of the cut-out A in the friction lining 1, which are of a smaller diameter for the reasons mentioned above. The support 2 may be provided in the form of a metal plate made from solid material, e.g. steel or another alloy of a type known from the prior art.

Figure 1:
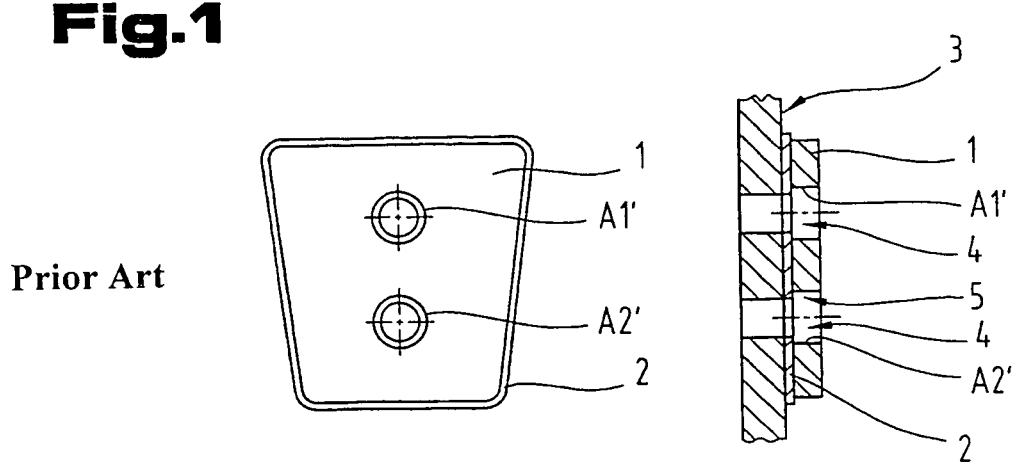
FIG. 1 shows a friction lining and an associated support based on the prior art.
Figure 3:
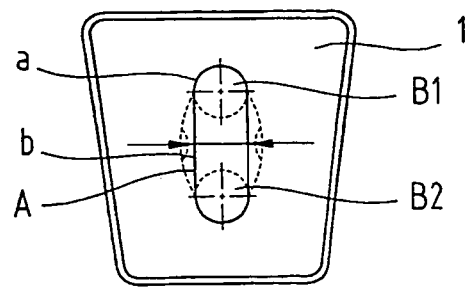
FIG. 3 shows a second embodiment of a friction lining proposed by the invention.

FIG. 3 illustrates a second embodiment of the friction lining 1 proposed by the invention, which is very similar to the friction lining 1 illustrated in FIG. 1. Instead of the narrowed region C, the cut-out A in this instance is bounded by at least approximately semi-circular portions a in regions B1 and B2 and in between, tangentially adjoining these portions a, straight portions b. The cut-out A is therefore based on a particularly simple shape. The width z of the intermediate region in this instance is the same size as the diameter of the circular portions a.

The portions a need not necessarily be semi-circular and it would also be possible to provide other rounded shapes.

As indicated by broken lines in FIG. 3, the cut-out A may also be cambered outwards relative to the diameter of portions a for the purpose of the invention, in which case a maximum diameter of the cut-out may also be bigger than the diameter of a portion a. Another option which may be used with this embodiment is one in which this cut-out does not extend constantly in the region between the two portions a but instead is provided with an outward camber in some areas, as indicated by broken lines in FIG. 3.

FIG. 4*a* illustrates a third embodiment of a friction lining 1 proposed by the invention, where three regions B1-B3 are provided, each as a means of accommodating connecting element for connecting or fitting the friction lining 1 to or on a supporting element, although the latter is not illustrated. The three regions B1-B3 are surrounded by a single cut-out A, which has narrowed regions C1-C3 between the regions B1-B3. Naturally, it would also be possible to provide the regions B1-B3 with circular portions—similarly to FIG. 3—joined by tangentially adjoining straight regions.

FIG. 4*b* illustrates a fourth embodiment of a friction lining 1 proposed by the invention, where four regions B1-B4 are provided, each for accommodating a connecting element for connecting or fitting the friction lining 1 to or on a supporting element, although the latter is not illustrated. The four regions B1-B4 are again surrounded by a single cut-out A, where the regions B1-B4 are joined by circular portions and tangentially adjoining straight portions in between. Alternatively, it would also be conceivable to provide narrowed regions between the regions B1-B4.

FIG. 4*c* illustrates a fifth embodiment of a friction lining 1 proposed by the invention, where there are also four regions B1-B4 provided, each as a means of accommodating a connecting element for connecting or fitting the friction lining 1 to or on a supporting element, although the latter is not illustrated. However, the four regions B1-B4 are not surrounded by a single cut-out A and instead a first cut-out A1 surrounds regions B1 and B2 and a second cut-out A2 surrounds regions B3 and B4.

In the case of the variants illustrated in FIGS. 3 to 4*c*, the support 2 to which the friction lining 1 is applied and by means of which it is connected to the supporting element 3 is naturally also provided.

It would naturally also be possible to opt for shapes other than those illustrated. For example, a shape combining those of FIGS. 2 and 3 could be used for a friction lining 1. For example, the left-hand boundary could be similar to the embodiment illustrated in FIG. 2 and the right-hand boundary could be similar to the embodiment illustrated in FIG. 3. In the case of FIG. 2, it would also be conceivable for the narrowed region C to be provided in the form of straight, in particular parallel, portions.

In the case of all the embodiments of the invention, it would also be possible for the narrowed region (s) or cambered region(s) of the cut-out to be provided with a straight boundary in at least certain regions rather than with a rounded contour.

The width z of the intermediate region is advantageously between 0.5% and 100% of the width of the regions B1 and B2. In principle, it would be conceivable for the widths z of the intermediate region to be more than 100%, in which case, however, it should be borne in mind that a larger width z would mean a reduced surface of the friction lining 1 and this would in turn lead to a reduction in the friction power that can be transmitted.

The cut-outs A, A1 and A2 are provided as a means of accommodating connecting elements in a counter-sunk arrangement, the latter being used to secure the friction lining 1 to the supporting element 3 via the support 2. To this end, the friction lining 1 may be glued or soldered to the support 2 or attached to it in some other manner without the aid of fixing means such as rivets or screws.

In particular, the component comprising the friction lining 1 and support 2 is provided for use with a clutch and is fitted on a clutch disc by means of rivets. Finally, it would also be conceivable for the friction lining 1, support 2 and another component (for example the clutch disc) to be riveted or screwed to one another in one work step.

The cut-outs A, A1 and A2 have been shown to be of advantage with respect to a subsequent process of cold forging the friction lining 1, e.g. in the form of a concave or convex shaping by pressing in order to obtain a better pattern of tension in the friction lining 1.

The boundary walls of the cut-outs A, A1 and A2 may be inclined—although this is not explicitly illustrated in the drawings.

The cut-outs A, A1 and A2 also need not necessarily have circular or cylindrical portions. It would also be possible to opt for variances form the arcuate shape.

Advantages can also be obtained in terms of the temperature distribution in the friction lining 1 when subjected to load as a result of the cut-out, thereby also improving the service life of the friction lining 1.

The cut-outs A, A1 and A2 in the friction lining 1 extend continuously through the friction lining 1.

As already explained above, the cut-out A may be produced during the process of pressing the sinter powder already. The cut-out can likewise be made in the friction lining 1 subsequently, e.g. using the methods mentioned above, although this is not the preferred variant for reasons of cost.

The friction lining 1 is glued to the support 2, in particular by means of adhesives specifically known for this purpose.

The friction lining 1 may be made from a sintered material known from the prior art for this application.

For the sake of good order, finally, it should be pointed out that, in order to provide a clearer understanding of the structure of the friction lining 1, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1 to 4*c* constitute independent solutions proposed by the invention in their own right. The objectives and associated solutions proposed by the invention may be found in the detailed descriptions of these drawings.

LIST OF REFERENCE NUMBERS

1 Friction lining
2 Support
3 Supporting element
4 Recess
5 Collar
A1', A2' Cut-out—prior art
A, A1, A2 Cut-out
a Circular portion
b Straight portion
B1 . . . B4 Fitting regions
C Narrowed region
z Width of intermediate region

The invention claimed is:

1. A method of producing a friction element comprising a friction lining made from sintered material, which is applied to a support, and at least two recesses are provided in the support, each for accommodating a connecting element for fitting the support with the friction lining on a supporting element, wherein the friction lining has a friction surface and a cut-out is provided in and extends continuously through the friction lining which surrounds at least two regions spaced apart from one another in which the at least two recesses of the support for accommodating the connecting elements are disposed, wherein both the cut-out and the at least two recesses are within the friction surface, wherein the cut-out has a larger diameter than the at least two recesses so that a collar is formed, and wherein the connecting elements sit on the collar when the support is secured to the supporting element.

2. The method according to claim 1, wherein the cut-out has a narrowed region between the at least two regions.

3. The method according to claim 1, wherein the cut-out in the at least two fitting regions is bounded by circular portions and tangentially adjoining straight portions in between.

4. The method according to claim 1, wherein the cut-out is produced prior to the sintering process during the process of pressing the sinter powder.

5. The method according to claim 1, wherein the cut-out is produced after the sintering process by one or more of the methods: milling, sawing, cutting, planning, broaching, grinding, punching or thermal cutting.

6. A friction lining made from sintered material, having a friction surface and at least first and second regions spaced apart from one another, the first region accommodating a first connecting element for fitting the friction lining on a supporting element and the second region accommodating a second connecting element for fitting the friction lining on a supporting element, wherein the first and second regions are disposed in a common cut-out in and extending continuously through the friction lining and the cut-out surrounds both the first and second regions, wherein both the cut-out and the first and second regions are within the friction surface, wherein the cut-out has a larger diameter than the first and second regions so that a collar is formed, and wherein the first and second connecting elements sit on the collar when the support is secured to the supporting element.

7. The friction lining according to claim 6, wherein the cut-out has a narrowed region between the at least two regions.

8. The friction lining according to claim 6, wherein the cut-out in the first and second regions is bounded by circular portions and by tangentially adjoining straight portions in between.

9. A friction element comprising a support on which a friction lining is disposed, wherein the friction lining is of the type according to claim 6.

10. The method according to claim 1, wherein the friction lining is glued or soldered to the support or attached to the support without the aid of rivets or screws.

11. The friction lining according to claim 6, wherein the friction lining is glued or soldered to the support or attached to the support without the aid of rivets or screws.

\* \* \* \* \*